Nov. 18, 1930.   R. H. LAZARUS   1,782,070
FLAG HOLDER
Filed May 2, 1929   2 Sheets-Sheet 1
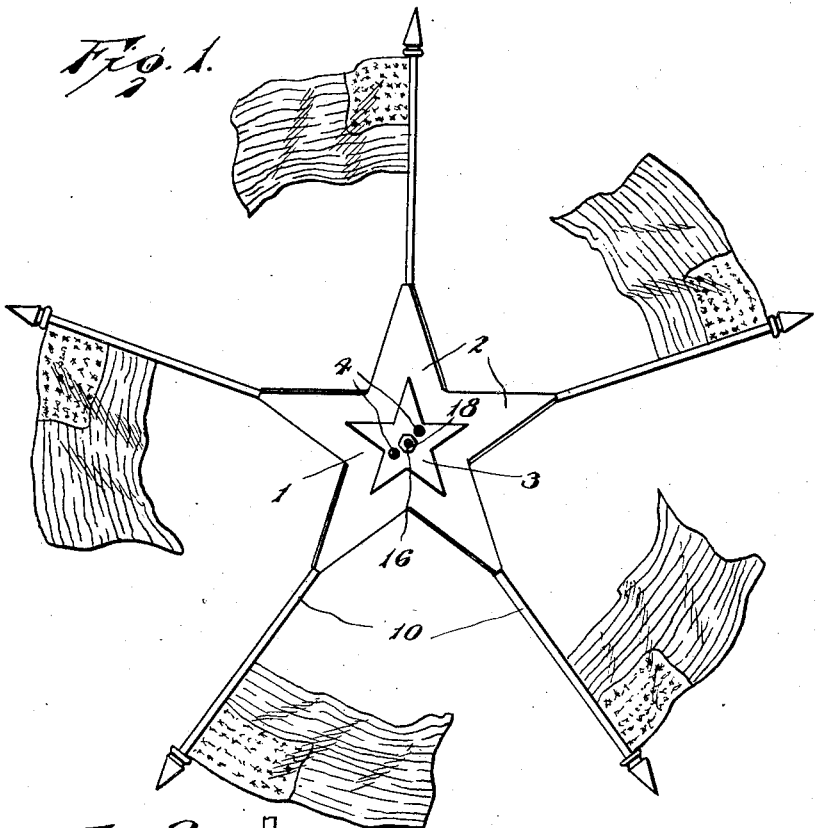
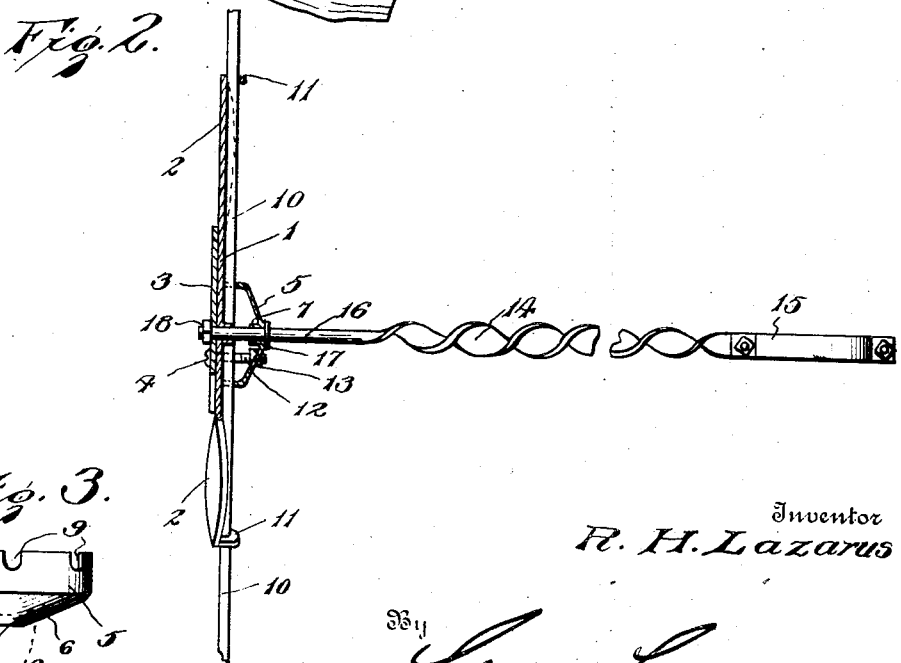
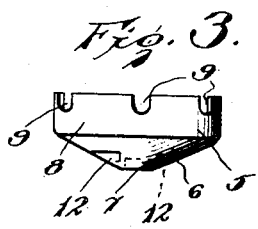
Inventor
R. H. Lazarus
By Lacey & Lacey, Attorneys

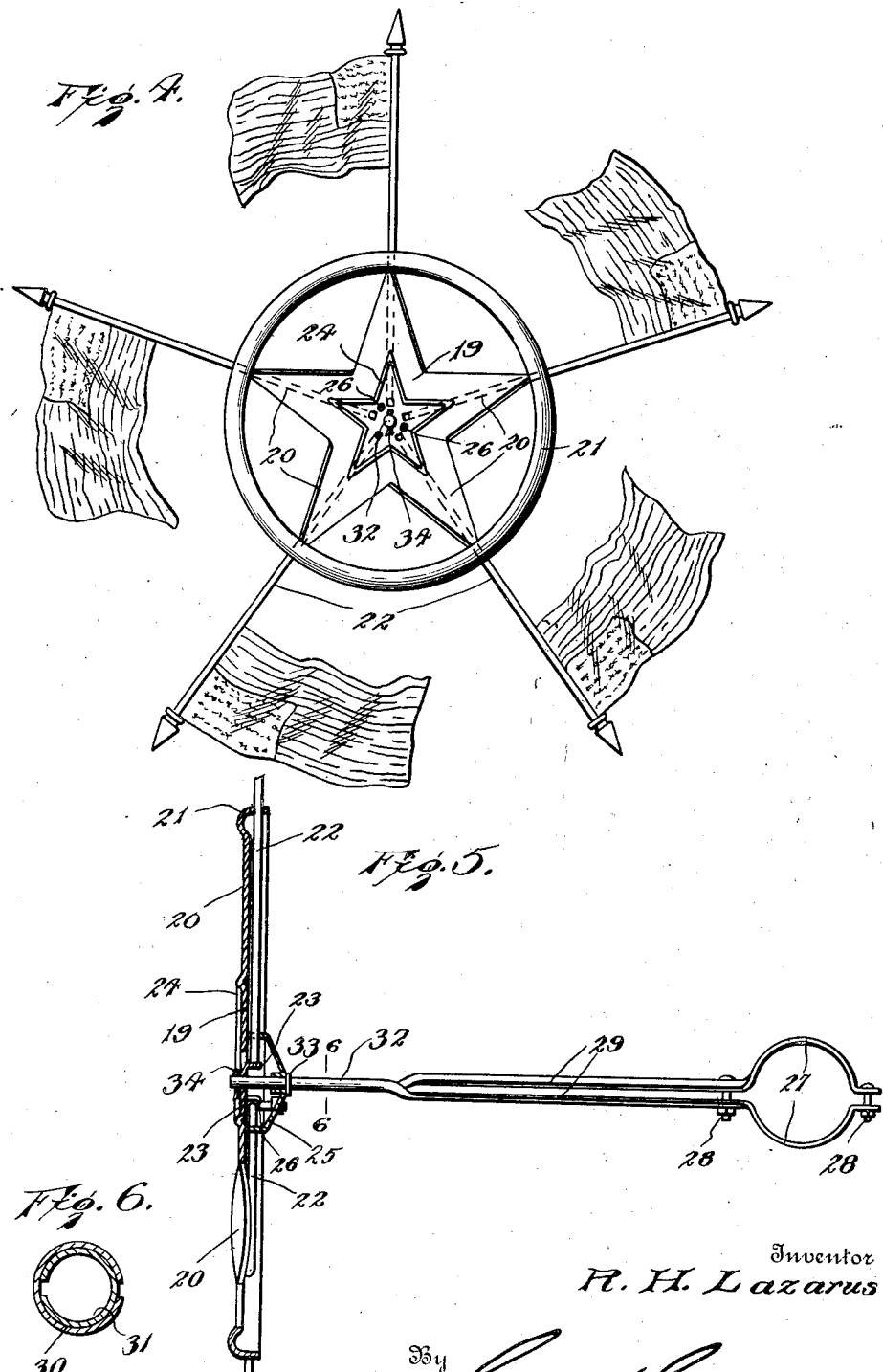

Patented Nov. 18, 1930

1,782,070

UNITED STATES PATENT OFFICE

REX H. LAZARUS, OF JACKSON, MICHIGAN

FLAG HOLDER

Application filed May 2, 1929. Serial No. 359,899.

This invention relates to automobile accessories and more particularly to a flag holder adapted to be secured to an automobile so that the automobile may be decorated with small flags during celebration of a national holiday.

One object of the invention is to provide a flag holder which may be connected with the filling neck of an automobile radiator and project forwardly therefrom so that flags carried by the holder will be disposed in front of the radiator where they will attract attention as well as serve to decorate the car.

Another object of the invention is to provide the holder with flag-carrying means rotatably mounted at the forward end of an arm which projects in front of the radiator and so form the flag-holding means that when the automobile is in motion or if the wind is blowing with sufficient strength the flag-holding means will be rotated. This will cause flags carried by the holder to swing about a circular path and cause the device to be very attractive when in use.

Another object of the invention is to allow flags to be very securely connected with the holder but at the same time permit them to be easily released and thereby allow the device to be stored in a small receptacle when not in use.

The invention is illustrated in the accompanying drawing, wherein—

Figure 1 is a view showing the flag holder in front elevation;

Fig. 2 is a view showing the holder partially in vertical section and partially in side elevation, Fig. 3 is an enlarged view of a clamp by means of which flags are securely but releasably held in engagement with the flag holder, Fig. 4 is a front elevation of a modified form of flag holder, Fig. 5 is a horizontal longitudinal sectional view through the flag holder, and Fig. 6 is an enlarged sectional view taken on the line 6—6 of Fig. 5.

The improved flag holder includes a body 1 which is preferably formed of sheet metal although any suitable material may be employed. This body which in the present illustration is in the form of a star is provided with arms 2 which radiate from the body and are bent transversely as shown in Figs. 1 and 2 so that they are pitched transversely and constitute propeller blades adapted to be acted upon by air currents and cause the body to rotate, as will be hereinafter brought out. A reinforcing plate 3, which preferably corresponds in shape to the body, fits against its forward face where it may be secured in any desired manner or merely held in place by bolts 4 which serve to retain a clamp 5 in position at the rear of the body. The clamp 5 is also preferably formed of sheet metal, and this clamp is cup-shaped and includes a head 6 having a bearing 7 formed centrally thereof and annular walls 8 which project from the margins of the head. These walls have notches 9 formed therein in spaced relation to each other circumferentially of the walls in order to receive flag staffs 10 which extend radially of the body against its rear face and are passed through perforated lugs 11 at the ends of the arm 2. Recesses or seats 12 are formed in the head 6 of the clamp at opposite sides of the bearing 7 to receive nuts 13 carried by the bolts 4, and it will be readily understood that since the nuts fit snugly into the recesses they will be prevented from turning and, therefore, when the bolts are tightened to draw the clamp forwardly into tight binding engagement with the flag staffs, there will be no danger of the bolts working loose and allowing the flag staffs to move out of their proper positions radially of the body.

In order to connect the device with the filling neck of an automobile radiator, I employ an arm 14 consisting of a strip of flat sheet metal which is twisted, as shown in Fig. 2, in order to increase its strength and prevent the arm from being easily bent. At its rear end the arm is provided with a clamp 15 to engage about the filling neck of an automobile with the arm projecting forwardly therefrom and at its forward end the arm terminates in a stem 16 which is circular in cross section and passes through the bearing 7 and registering openings 10 formed centrally in the body 1 and reinforcing plate 3. A collar 17 is carried by the stem 16 to limit rearward movement of the flag holder upon the stem and a nut 18 is screwed upon the forward end of the stem to retain the flag holder in place thereon. The clamp 5 serves not only as means to secure the flag staffs but also constitutes a hub for the body and, therefore, the flag holder or body 1 may rotate about the stem without wabbling thereon and since it is confined between the abutment collar 17 and the securing nut 18 it may turn freely.

When the improved flag holder is in use, the clamp 15 is secured about the filling neck of the radiator of an automobile beneath the cap of the filling neck and the arm projects forwardly. The staffs of the flags are passed inwardly through the perforated ears 11 at the ends of the arms or blades 2 and thrust through the recesses or notches 9 in the clamp or hub 5. The bolts 4 are tightened and draw the clamp forwardly so that they tightly bind the flag staffs against the rear face of the body and prevent them from moving out of the radial relation to the body. After the flags have been secured, the holder is set in place upon the stem at the forward end of the arm 14 and the securing nut screwed upon the stem. Air currents caused by wind or by forward motion of the automobile will act against the blades 2 thereby causing the flag holder or body to rotate about the stem. It will thus be seen that, when an automobile is in motion, the flag holder will rotate and the device will be very attractive in its appearance and serve very effectively as a decoration for the automobile. When it is no longer desired to use the flag holder, the clamp is released from the radiator neck and the body can be easily removed from the stem and the bolts loosened so the flags may be withdrawn. The flags and the elements constituting the holder can then be placed in a small box where they will be protected until they are again to be used.

In Figs. 4, 5 and 6, there has been shown a modified construction. In this form of the invention, the body portion or head 19 is formed of sheet metal and is provided with arms or extensions 20 which are twisted transversely so that they will function as propeller blades similar to the manner in which the arms 2 of the form shown in Figs. 1 and 2 operate. The arms of the star-shaped body carry a rim 21 which is preferably formed integral with the body and this rim is bent so that it is curved transversely, as shown in Fig. 5, and project rearwardly from the head. Openings are formed in the rim to receive the flag staffs 22 which extend radially of the body and these flag staffs have their inner ends bearing against abutments 23 formed by tongues struck from the central portion of the body and bent rearwardly. By this arrangement the flag staffs will be prevented from sliding inwardly and bearing against a stem or spindle about which the body rotates. Instead of employing a disk to reinforce the central portion of the body, there has been provided a bead 24 which projects forwardly, as shown in Fig. 5, and preferably corresponds in shape to the body, as shown in Fig. 4, although the reinforcing bead may be of any outline desired. A hub 25, which is similar in construction to the hub 5, fits against the rear face of the body where it is held by securing bolts 26 and this hub which constitutes a clamp for the flag staffs has its walls formed with recesses through which the flag staffs extend so that, when the bolts are tightened, the hub or clamp will have tight binding engagement with the flag staffs and firmly hold them in place.

The mounting, which is shown in Fig. 5, is also of a modified construction and consists of a pair of sheet metal strips which may be of any length found desirable. These strips are bent to form jaws 27 adapted to be disposed about a filling neck of a radiator where they will be tightly bound when the securing bolts 28 are tightened. The portions of the strips leading from the jaws constitute arms 29 which may be curved transversely in order to add strength to the arms and the free end portions of the strips are rolled to provide tubes 30 and 31 disposed one within the other, as shown in Fig. 6, and forming a reinforced stem 32. This stem which is circular in cross section extends centrally through the clamp and body and carries a collar 33 to limit rearward movement of the body upon the stem or spindle. A cotter key 34 may be passed through the free end of the spindle to prevent the body from moving forwardly off the same or a nut, such as shown in Fig. 2, may be used instead of a cotter key. The operation of this form of the invention is similar to that of the form illustrated in Figs. 1 and 2 and, therefore, need not be set forth in detail.

Having thus described the invention, I claim:

1. A flag holder comprising a body having radiating arms constituting propeller blades, flag staff-engaging tongues at the outer ends of said arms formed with staff-receiving openings whereby flag staffs may be passed through the tongues longitudinally of the arms with their inner ends terminating adjacent the center of the body, an opening being formed in the center of the body, a clamping cup fitted against the central portion of said body and having a head formed with an opening alined with the central opening of the body and an annular wall notched to receive the inner end portions of the flag staffs, securing bolts to releasably retain said cup in clamping engagement with the flag staffs, a stem passed through the alined openings of the cup and body to rotatably mount the body, and means for connecting said stem with a support.

2. A flag holder comprising a body having radiating arms constituting propeller blades, flag staff-engaging tongues at the outer ends of said arms formed with staff-receiving openings whereby flag staffs may be passed through the tongues longitudinally of the arms with their inner ends terminating adjacent the center of the body, a clamping cup fitted against the central portion of said body and having seats to receive the inner end portions of the flag staffs, bolts carried by said body and passed through said cup to draw the cup towards the body into tight binding engagement with the flag staffs, and support-engaging means having a stem passed through the cup and body to rotatably mount the body.

3. A flag holder comprising a body having radiating arms twisted transversely to form propeller blades, flag-staff engaging means at the outer ends of said arms formed with staff-receiving openings whereby flag staffs may be passed through the openings with their inner ends terminating adjacent the center of the body and their outer flag-carrying portions projecting from the arms, a clamp fitting against the central portion of said body and having seats to receive the inner end portions of the flag staffs, means to releasably secure the clamp in binding engagement with the body and flag staffs, and a mounting adapted to be secured to a support and having a stem passed centrally through the clamp and body to rotatably mount the body.

4. A flag holder comprising a body having radiating arms twisted transversely to form propeller blades, means to engage flag staffs and retain the staffs against the body longitudinally of the arms with their outer flag-carrying portions projecting from the arms, a clamp fitting against said body for engaging the inner end portions of the flag staffs, means to releasably secure the clamp in binding engagement with the body, means extending from the body within the clamp to engage the inner ends of the flag staffs and limit inward movement of the staffs, and a mounting adapted to be secured to a support and having a stem passed centrally through the clamp and body to rotatably mount the body.

In testimony whereof I affix my signature.

REX H. LAZARUS. [L. S.]